May 6, 1952     T. B. THOMSON ET AL     2,595,425
HORSEPOWER INDICATOR
Filed Jan. 18, 1947
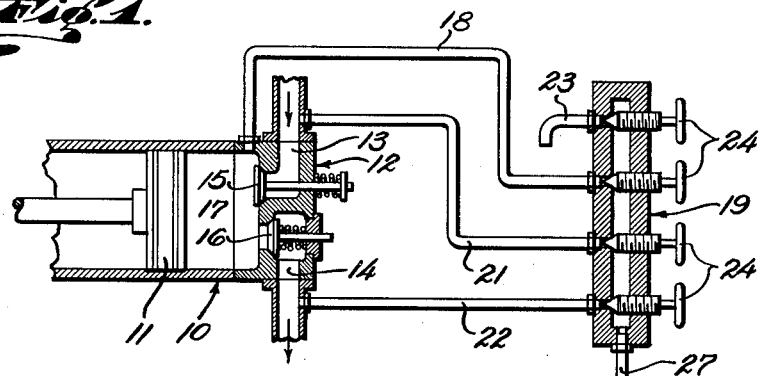
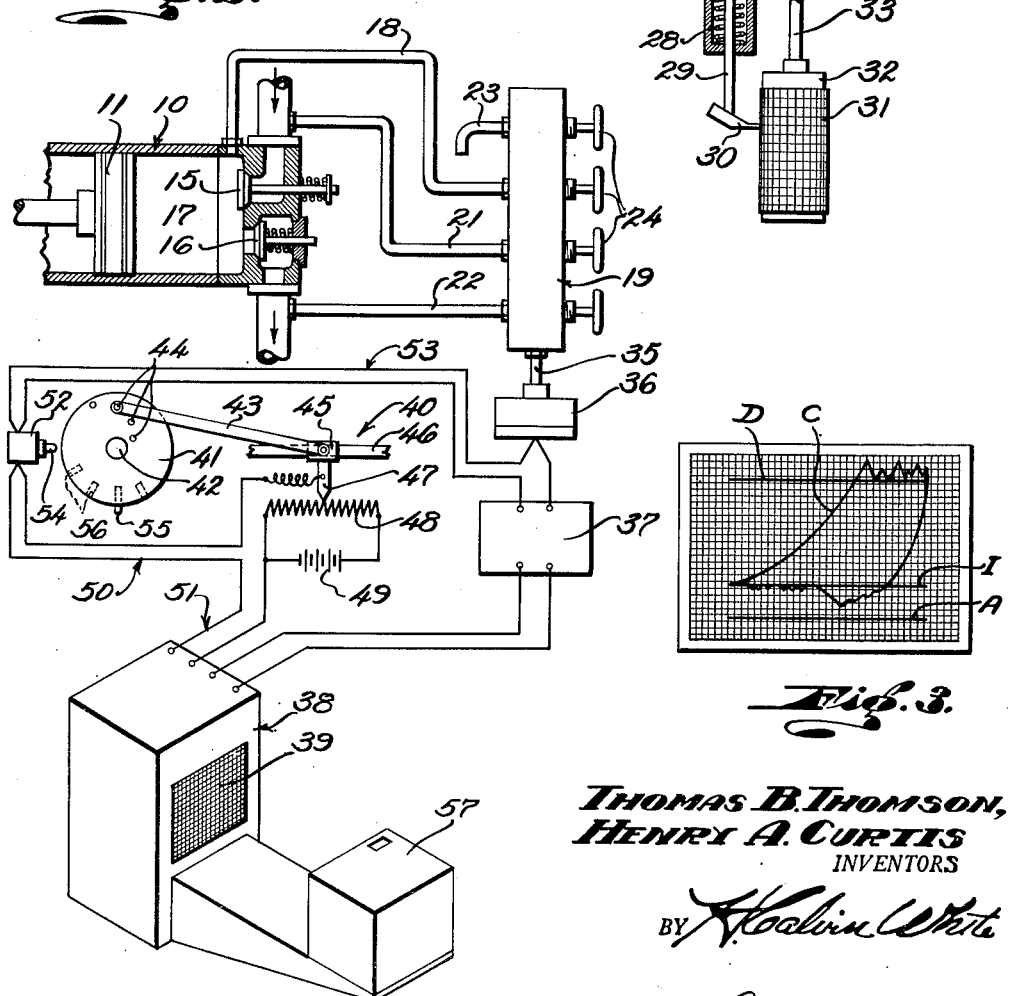
THOMAS B. THOMSON,
HENRY A. CURTIS
INVENTORS
BY
ATTORNEY Patented May 6, 1952

2,595,425

UNITED STATES PATENT OFFICE 2,595,425

HORSEPOWER INDICATOR

Thomas B. Thomson, Altadena, and Henry A. Curtis, Whittier, Calif., assignors to The Fluor Corporation, Ltd., Los Angeles, Calif., a corporation of California Application January 18, 1947, Serial No. 722,918

7 Claims. (Cl. 73—115)

This invention has to do generally with improved apparatus for determining the operating characteristics and efficiencies of mechanisms such as piston type pumps, compressors, steam engines and the like. Particularly the invention deals with equipment for indicating and recording various pressure conditions, determination of some or all of which is of importance for the purpose of ascertaining the efficiency and horsepower of the mechanism.

It is common practice to measure and record pressure conditions in for example a compressor cylinder, by the use of an indicator which produces a chart or so-called card in the form of a curve developed by an instrument responsive to the varying cylinder pressure and to the movement of the mechanism or piston. Such known recorders are of a strictly mechanical type, or of an electronic or oscilloscope type. They produce a curve, the significance of which depends upon its shape and relationship of one portion to another.

One principal object of the invention is to provide improved recording apparatus capable of supplementing the usual cylinder pressure curve with pressure data related to such other values as the cylinder intake and discharge pressures, as well as the atmospheric pressure, from or by reference to which it is possible to more exactly evaluate and interpret the significance of the cylinder pressure curve.

Generally speaking, the invention contemplates rendering an appropriate recording apparatus responsive to any or all of the cylinder intake and discharge pressures and the atmospheric pressure, in addition to the cylinder pressure, preferably by a manifold arrangement affording communications with the several pressure sources and permitting selective pressure transmission to the recorder. Particularly contemplated is the adaptation of the recorder to produce on a single chart, card or other record receiving medium, a composite record of all the pressures investigated.

The invention has various additional features and objects, all of which will be recognized and understood from the following detailed description of certain typical embodiments of the invention shown by the accompanying drawings, in which:

Fig. 1 is a diagrammatic sectional view illustrative of one embodiment of the invention;

Fig. 2 is a similar view showing a variational form of the invention; and

Fig. 3 is an illustration of a typical photographic record obtainable by the apparatus of Fig. 2.

Referring first to Fig. 1, it will be understood that the invention is adaptable for the recording or indication of pressure conditions in and with relation to various piston and cylinder mechanisms such as pumps, compressors, steam engines and the like. In the drawings such mechanisms are typified by a cylinder 10 containing a reciprocating piston 11, the cylinder head 12 having any of the conventional arrangements of fluid intake and discharge passages 13 and 14 controlled by the intake and discharge valves 15 and 16.

The cylinder chamber 17 is communicable by way of pipe 18 with a manifold 19, which in turn is in pressure communication with a recording instrument generally indicated at 20. As previously indicated, the principal object of the invention is to provide for the indication, or recording, not only of the cylinder pressure cycle, but also the pressures existing in either or both of the intake and discharge passages 13 and 14, and also the atmospheric pressure. Thus the manifold 19 is connected with passages 13 and 14 by way of pipes 21 and 22, and with the atmosphere through pipe 23. Provision is made for rendering the recorder 20 selectively responsive to the cylinder pressure, the intake and discharge passage pressure and the atmospheric pressure, as by a plurality of valves 24, which may be conveniently included in the manifold, and which may be adjusted to communicate to the recorder at any one time, any of the above enumerated pressures.

In the broad contemplation of the invention, the pressure responsive indicator or recorder may be of any suitable type capable of representing pressure changes in the cylinder throughout a complete cycle of the piston stroke. Fig. 1 is intended to indicate at 20 a conventional type of mechanical indicator, of which many specific forms are known, operable to produce a chart or so-called card indication of the cylinder pressure cycle. Such recorders comprise a pressure responsive element such as piston 25 contained in cylinder 26 connected by pipe 27 to the manifold 19, displacement of the piston by the manifold pressure being resisted by spring 28. The piston stem 29 carries a pen 30 for marking on the chart or card 31 carried by an oscillating holder 32. As will be understood, the holder shaft 33 may be driven in any of the usual manners from an appropriate part of the pump, engine or compressor mechanism so that the holder is operated in predetermined timed relation to the reciprocations of the piston 11. Specifically, the relationship between the holder movement and the piston travel is such that the holder and chart will be given one complete reverse oscillation for each complete cycle of the piston stroke.

By adjusting valves 24 so that the pen 30 moves only in response to the pressure in the cylinder chamber 17, the pen describes on the chart an endless curve of the general character indicated at C in Fig. 3, which corresponds to the usual card indicating the cylinder pressure changes throughout the stroke cycle of the piston and corresponding valve operation. The manifold valve adjustment then may be changed to render the recorder responsive to the cylinder discharge pressure communicated through line 22, the pen producing on the chart line D representing the discharge static pressure. Similarly, the manifold valves may be readjusted to record on the chart the intake static pressure communicated through line 21 and represented by line I on the chart, and then the atmospheric pressure communicated through pipe 23 and represented by the line A. As previously explained, the cylinder pressure curve C and its shape characteristics, and also the machine performance characteristics which the curve represents, are rendered capable of interpretation with considerably greater meaning and significance by reason of the recordings of the pressures represented by the lines D, I and A, and particularly so by reason of all being on the same chart or card.

Fig. 2 illustrates a variational form of the invention similar to the described embodiment except with respect to the recording apparatus which in this instance is an oscilloscope type operable to project a light producing electron beam in paths describing the cylinder pressure curve, and intake, discharge and atmospheric pressures, as the case may be. Here the manifold 19 is connected by tube 35 with a pressure pickup 36 which may be of any known type operable to convert fluid pressure to an electrical output potential or current flow bearing an exact accordance with the fluid pressure. Typically, the pickup 36 may be a pressure transmitter of the type manufactured by Statham Laboratories, Los Angeles, California, e. g. model P–2. The pressure transmitter output is taken through an amplifier 37 to a suitable oscilloscope, generally indicated at 38, of standard type modified to the extent that its vertical deflection plates can be operated by direct current. Accordingly, the pressure transmitter output voltage, varying in accordance with the fluid pressure changes, will produce corresponding vertical deflection of an electron beam projected by the oscilloscope on the face of its tube or screen 39.

A suitable synchronizing instrument, generally indicated at 40, is used to produce horizontal deflection of the oscilloscope beam in timed relation with the piston travel cycle. Typically, the synchronizer may comprise a rotating disc 41, the shaft 42 of which may be driven by the pump or compressor, as by friction application to the end of a crank or fly wheel shaft. A crank arm 43, pivotally attached to the disc at any of the locations 44 having different radial distances from the disc axis, attaches to a slide 45 reciprocable on the guide 46 and carrying a conductor 47 movable along a resistance wire 48. The latter, together with battery 49 are connected in the circuit 50 containing leads 51 attaching to the horizontal deflection plates of the oscilloscope. Circuit 50 is connected to the switch 52 which in turn is connected through circuit 53 with the pressure pickup 36 and amplifier 37. Switch 52 may be of a push button type comprising a pin 54 engageable by a pin 55 inserted within one of the disc openings 56, so that successive interengagements of the pins will operate to open and close the switch.

As the disc 41 rotates, the movement of the crank arm will cause the sliding contact 47 to reciprocate along the resistance wire 48, thereby causing transmission to the horizontal deflection plates of the oscilloscope a voltage varying in timed relation with the piston travel. By adjusting the crank arm and throw ratio in the synchronizer to correspond with those of the compressor, then the voltage transmitted to the horizontal deflection plate of the oscilloscope will be a direct function of the piston displacement.

Assuming that the cylinder pressure is being transmitted through line 18 to the pressure pickup 36, from the foregoing it will be understood that the oscilloscope 38 will operate to project on the screen 39 a light spot traveling in a path represented by the curve C in Fig. 3. The purpose of the switch 52, if used, is to permit observation or recording of a single sweep of the oscilloscope beam through the path represented by curve C, thus avoiding any variances from a single path described by the beam, as a result of superposition of successive beam cycles. Assuming pins 54 and 55 to interengage to close the switch, the oscilloscope beam then travels exactly one complete cycle of the curve C, to the point at which the pins again interengage to open the circuit and interrupt the beam. Thus between these interruptions, a single beam cycle can be photographed or otherwise recorded or reproduced.

Thereafter, as the pressure pickup 36 is successively exposed to the cylinder intake and discharge pressures transmitted through lines 21, 22 into the atmospheric pressure communicated through pipe 23, the oscilloscope beam travels paths on the screen corresponding respectively to lines I, D and A in Fig. 3.

If it is desired to investigate transient pressure conditions in the cylinder, moving pictures may be made of the beam travel on the screen, and the pictures can later be investigated in slow motion. If it is desired to make a single record of the beam travel for such purposes as horsepower measurement, a still camera may be used to photograph the screen. For this purpose the oscilloscope screen may be etched as illustrated to carry reference or calibration lines permitting direct evaluations of the magnitudes of the pressures represented by the beam travel thereon. The screen may be photographed as by means of a still camera 57 facing the screen as illustrated. The oscilloscope and camera assembly may be placed in a dark enclosure and the camera operated to photograph on a single film the pressure lines C, D, I and A representing the successive beam courses taken as the manifold valves are operated to transmit the corresponding pressures to the recording apparatus. Thus, assuming the three static pressures, i. e. atmospheric, cylinder intake and discharge, to be known or determinable, the composite chart appearing in Fig. 3 can be used to accurately measure the operating efficiency and horsepower of the compressor cylinder.

We claim:
1. In combination with a cylinder and piston mechanism having a cylinder chamber and intake and discharge passages, a manifold, conduits providing separate communication between said manifold and the chamber and each of the passages, valve means selectively controlling said conduits, a pressure recorder connected to said manifold, and means for operating said recorder in timed relation to the piston, whereby by successive operation of said valve means for separate piston cycles there will be obtained a pressure diagram of the cylinder having a record of the passage pressures superimposed thereon.

2. In combination with a piston and cylinder mechanism having a cylinder chamber and intake and discharge passages, a manifold, conduits providing separate communication between said manifold and the chamber, each of the passages, and the atmosphere, valve means selectively controlling said conduits, a pressure recorder connected to said manifold, and means for operating said recorder in timed relation to the piston, whereby by successive operation of said valve means for separate piston cycles there will be obtained a pressure diagram of the cylinder having a record of the passage pressures and atmospheric pressure superimposed thereon.

3. In combination with a piston and cylinder mechanism having a cylinder chamber and intake and discharge passages, a manifold, conduits providing separate communication between said manifold and the chamber and each of the passages, valve means selectively controlling said conduits, a pressure recorder connected to said manifold and including a movable record receiving medium, and means for moving said medium in timed relation to the piston, whereby by successive operation of said valve means for separate piston cycles there will be obtained a pressure diagram of the cylinder having a record of the passage pressures superimposed thereon.

4. In combination with a piston and cylinder mechanism having a cylinder chamber and intake and discharge passages, a manifold, conduits providing separate communication between said manifold and the chamber, each of the passages, and the atmosphere, valve means selectively controlling said conduits, a pressure recorder connected to said manifold and including a movable record receiving medium, and means for moving said medium in timed relation to the piston, whereby by successive operation of said valve means for separate piston cycles there will be obtained a pressure diagram of the cylinder having a record of the passage pressures and of atmospheric pressure superimposed thereon.

5. In combination with a piston and cylinder mechanism having a cylinder chamber and intake and discharge passages, a manifold, conduits providing separate communication between said manifold and the chamber and each of the passages, valve means selectively controlling said conduits, a pressure indicator comprising an oscilloscope, pressure responsive means connected to said manifold and to said oscilloscope for effecting vertical deflection of the light-producing beam thereof in accordance with manifold pressure, means operating in timed relation to the piston and operatively connected to said oscilloscope for effecting horizontal deflection of the light-producing beam thereof in timed relation to piston cycles, whereby successive operation of said valve means for separate piston cycles will cause said light-producing beam to separately describe a diagram of the chamber pressure and lines indicating the passage pressures, and means for recording the indications of said light-producing beam to produce a composite record of said pressures.

6. In combination with a piston and cylinder mechanism having a cylinder chamber and intake and discharge passages, a manifold, conduits providing separate communication between said manifold and the chamber and each of the passages, valve means selectively controlling said conduits, a pressure indicator comprising an oscilloscope, pressure responsive means connected to said manifold and to said oscilloscope for effecting vertical deflection of the light-producing beam thereof in accordance with manifold pressure, means operating in timed relation to the piston and connected to said oscilloscope for effecting horizontal deflection of the light-producing beam thereof in timed relation to piston cycles, whereby successive operation of said valve means will cause said light-producing beam to separately describe a diagram of the chamber pressure and lines indicating the passage pressures, and means for photographing the screen of said oscilloscope to produce a composite record of said pressures.

7. In combination with a piston and cylinder mechanism having a cylinder chamber and intake and discharge passages, a manifold, conduits providing separate communication between said manifold and the chamber, each of the passages, and the atmosphere, valve means selectively controlling said conduits, a pressure indicator comprising an oscilloscope, pressure responsive means connected to said manifold and to said oscilloscope for effecting vertical deflection of the light-producing beam thereof in accordance with manifold pressure, means operating in timed relation to the piston and connected to said oscilloscope for effecting horizontal deflection of the light-producing beam thereof in timed relation to piston cycles, whereby successive operation of said valve means will cause said light-producing beam to separately describe a diagram of the chamber pressure and lines indicating the passage pressures and atmospheric pressure, and means for photographing the screen of said oscilloscope to produce a composite record of said pressures.

THOMAS B. THOMSON.
HENRY A. CURTIS.

REFERENCES CITED

The following references are of record in the file of this patent:

UNITED STATES PATENTS

| Number | Name | Date |
| --- | --- | --- |
| 658,531 | Ripper | Sept. 25, 1900 |
| 1,265,953 | Pittman | May 14, 1918 |
| 2,133,437 | Dodds | Oct. 18, 1938 |
| 2,190,713 | Hintze et al. | Feb. 20, 1940 |
| 2,255,809 | Prescott | Sept. 15, 1941 |